United States Patent [19]

Leone et al.

[11] 4,227,832
[45] Oct. 14, 1980

[54] DOCKSIDE PROTECTIVE DEVICE FOR BOATS

[76] Inventors: Anthony J. Leone, 3301 Raleigh St., Hollywood, Fla. 33021; Raymond A. Leone, 4891 SW. 36 Ct., Pembroke Park, Fla. 33023; James Long, 10120 Torchwood Ave., Plantation, Fla. 33024

[21] Appl. No.: 908,642

[22] Filed: May 23, 1978

[51] Int. Cl.³ .............................................. E02B 3/22
[52] U.S. Cl. .................................... 405/215; 114/219; 267/140
[58] Field of Search .................... 61/48, 104; 114/219; 267/139, 140; 405/212, 215

[56] References Cited

U.S. PATENT DOCUMENTS

| | | | |
|---|---|---|---|
| 3,449,917 | 6/1969 | Roskopf | 61/48 |
| 3,498,252 | 3/1970 | Peacock | 114/219 |
| 3,503,600 | 3/1970 | Rich | 61/48 X |
| 3,574,379 | 4/1971 | Jordan | 267/140 X |
| 3,593,531 | 7/1971 | Saadeh | 61/48 |
| 3,741,598 | 6/1973 | Novak et al. | 267/140 X |
| 3,950,953 | 4/1976 | Matthews | 405/215 |

Primary Examiner—David H. Corbin

[57] ABSTRACT

A generally cylindrical member and a vertically extending H-member with mounting brackets for fixed mounting relative to a support member such as a piling in a boat docking area are provided, the H-member is fixed as by bolts in a vertical relation to the side of a piling which would normally contact a boat, docked adjacent thereto. The cylindrical member includes a normally deformed T-slot vertically along a vertical inner side thereof for frictional sliding engagement over the outer T-portion of the H-member. One or more of the cylindrical members may be supported in an end to end relation to extend to any desired depth in the water and distance above the water surface on a single elongated H-member to accommodate the depth of the water as well as the extremes of tidal flow and wave action in any particular locale.

12 Claims, 7 Drawing Figures

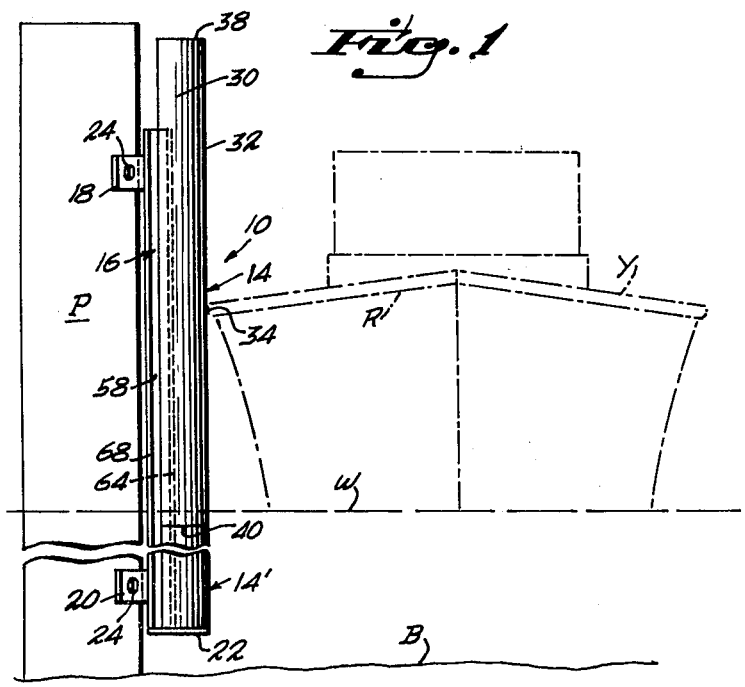
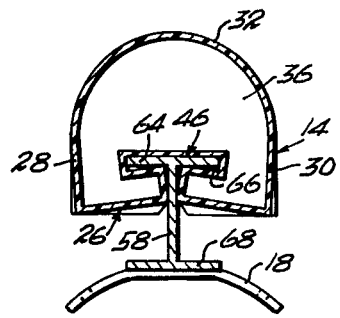
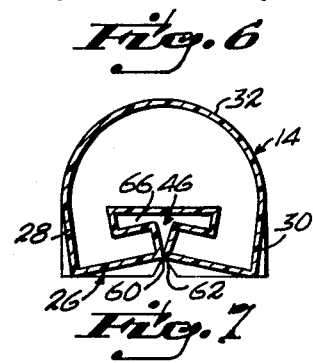
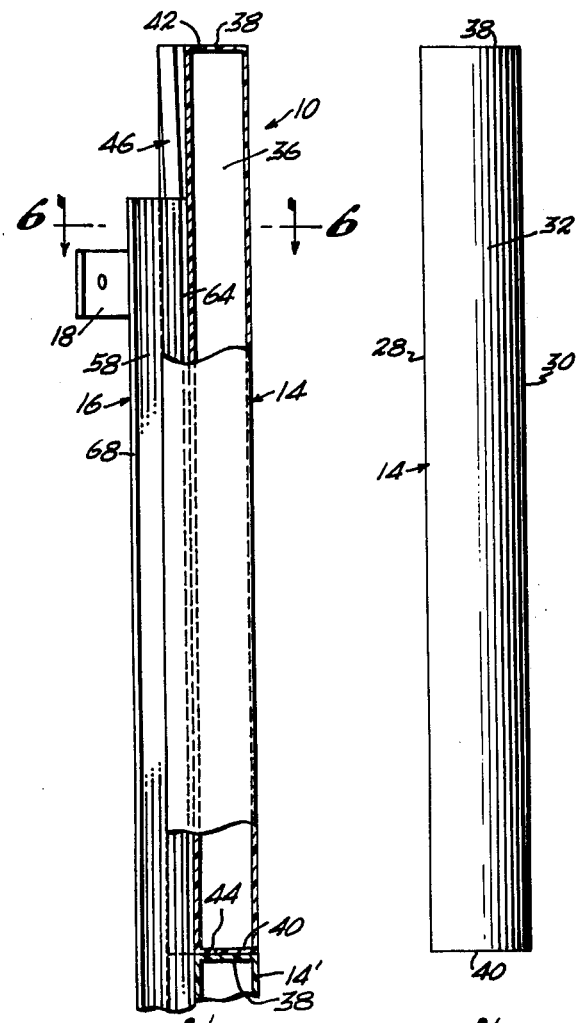
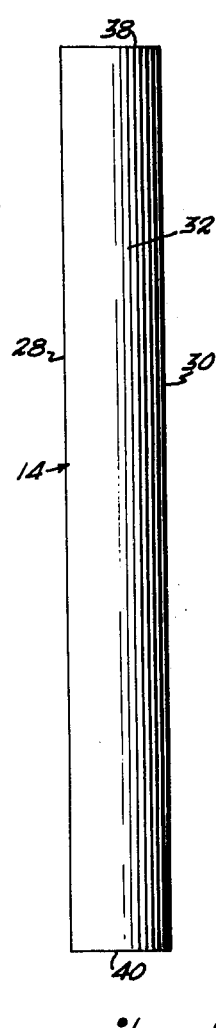
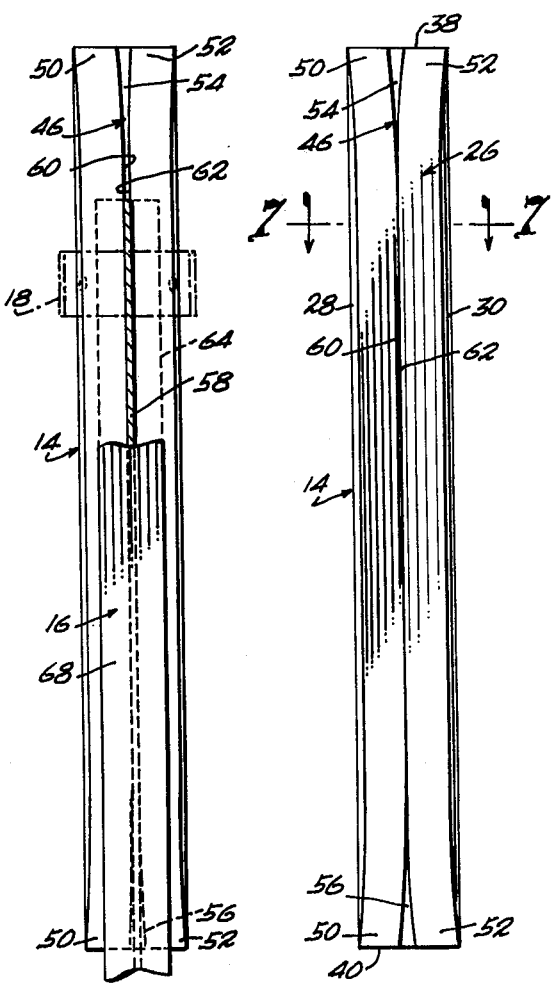

DOCKSIDE PROTECTIVE DEVICE FOR BOATS

BACKGROUND OF THE PRESENT INVENTION

The provision of adequate protective devices for boats of all sizes in commercial marinas as well as in private docking areas has been an increasing problem with the very rapid increase in the number of pleasure boats ranging from small open boats to large yachts. Many lake and seaside resorts, hotels, restaurants, etc., provide private docking areas, for example, to lure boating enthusiasts to their establishments. In such establishments, the owners assume responsibility for the safety of the boats in regards to their own facilities. Particularly in seaside areas, where the tides as well as widely varying degrees of wave action must be reckoned with, the bumpers or protective devices on pilings which are deeply embedded in the bottom of the water area must be frequently replaced to provide adequate protection, particularly for larger boats. The pilings generally define boat slips as well as being rather closely spaced along the lengths of docking piers, and the rub rails, generally around the top edges of boat hulls, beat constantly against the bumpers on protective devices which are designed to cushion the constant impacts to prevent damage to the boats.

Consequently, the protective devices currently in general usage are quite expensive and relatively short lived because of the constant beatings they receive. Their replacement requires their complete removal from the pilings from well below the water level to a substantial distance above water level and new protective devices must be fastened in palce, resulting in a substantial labor cost which must be added to the cost of the protective devices.

Therefore, one of the principal objects of the present invention is to provide a protective device for docked boats for vertical attachment relative to support means such as a piling which includes a carriage means such as an elongated H-beam which is permanently fixed to a piling from a point well below the water level to a desired elevation above the water level, and protective means such as a cylindrical member provided with a T-slot along one side thereof for sliding reception of an outer T-portion of the H-beam.

Another principal object of the present invention is to provide cylindrical protective members constructed in a manner whereby two or more of said members may be slidingly engaged on a single H-beam in an end to end relation to accommodate any desired extensions beneath and above water level.

A further object of the instant invention is to provide protective means for docked boats which can be replaced in a minimal amount of time by simply sliding the old protective members vertically upwardly from the H-beam and replacing them by sliding new protective members vertically downwardly onto the H-beam.

Yet another object of the present invention is to form the tubular protective members of a suitable inexpensive high impact semi-flexible plastic material.

BRIEF DESCRIPTION OF THE DRAWINGS

FIG. 1 is a side elevational view of a typical installation of a boat protective device of the present invention installed on a typical piling;

FIG. 2 is an enlarged view similar to FIG. 1 with parts broken away to better illustrate its construction;

FIG. 3 is a front elevational view of the boat protective device;

FIG. 4 is a rear elevational view thereof;

FIG. 5 is a rear elevational view of the cylindrical portion of the device removed from the H-beam;

FIG. 6 is a cross sectional view taken along line 6—6 of FIG. 2; and

FIG. 7 is a cross sectional view taken along line 7—7 of FIG. 5.

DETAILED DESCRIPTION OF A PREFERRED EMBODIMENT

With reference to the drawings, in which like reference characters designate like or corresponding elements throughout the various views and with particular reference to FIG. 1, the boat protective device is indicated generally at 10, fixed to a piling member P, the water level being indicated at W and the bottom at B.

As best illustrated in FIGS. 1, 2 and 6, a cylindrical member indicated generally at 14 is carried on an H-beam 16, preferably formed of a metal such as aluminum, which carries at least two generally semi-circular fastening brackets 18 and 20, welded thereto adjacent its respective ends. If desired similar intermediate brackets may be provided. In a typical installation, the H-beam is of a substantial length and two cylindrical members 14 and 14' are carried thereon. For example, the H-beam may be approximately eleven feet long and the members 14, 14' mounted in an end-to-end relation are each six feet long. An outwardly extending finger 22, welded across the bottom of the H-beam supports cylindrical members 14, 14'. In this manner, the members 14, 14' extend from a point adjacent the bottom B in relatively shallow water to a substantial distance above water level W, and somewhat, approximately one foot, above the H-beam 16. These dimensions, of course, can be varied to accommodate existing water levels as well as known tidal and wave conditions. The brackets 18, 20 are fixed to the piling by fastening means 24.

With particular reference to FIGS. 6 and 7, each cylindrical member is formed as by molding of a suitable high impact plastic material and includes a back wall 26, side wall 28, 30 and a rounded front wall 32 for contact with the rub rail R of a boat Y as at 34. Walls 26, 28, 30 and 32 define an inner chamber 36 which is enclosed by opposed end walls 38 and 40, FIG. 2, which are provided with relatively small holes such as 42, 44 to permit them to fill with water.

With further reference to FIGS. 6 and 7, a distorted T-slot 46 bisects the back wall 26 along the vertical length of each cylindrical member such as 14. The T-slot 46 is deformed as best illustrated in FIG. 7 by the natural drying process after its removal from the mold. As best seen in FIG. 5, the end walls 38, 40 support the end portions 50, 52 of the back wall 26 against deformation causing lead in separations or slots 54, 56 for receiving a central connecting web 58 of H-beam 16. Along the main central portion of the back wall 26 outer edges 60, 62 of T-slot 46 are in general contact as in FIG. 5, and when inserted on the outer T-portion of an H-beam, FIG. 4, said edges 60, 62 embrace the center web 58 of H-beam 16 and one side flange portion 64 thereof is nested in the cross portion 66 of T-slot 46. Opposed flange portion 68 of H-beam 16 carries the fastening brackets 18, 20.

In tests, the cylindrical members 14 have proven to be very durable and are very inexpensive to produce. Replacement labor costs have been reduced to a point of virtual elimination as the old cylindrical members are simply slid off of the H-beam 16 and new ones slid into place as opposed to the task of removing attachment means along both the underwater and above water lengths of conventional boat protective devices of this nature, and replacing same with similar attachment means.

What is claimed is:

1. For attachment relative to a vertical member such as a piling in a boat docking area, a protective device for boats comprising:

an elongated vertically extending H-like beam having an inner portion with means for fixedly mounting the beam to a piling-like boat docking structure, and an outer T-shaped portion extending horizontally from the inner portion along the vertical length of the beam, an elongated vertically extending, resilient protective member having
  a top end,
  a bottom end,
  an outside abutment surface,
  a T-shaped inner wall vertically extending from the top end to the bottom end of the protective member, the T-shaped inner wall defining a seam, the seam being distended and enlarged at both ends of the protective member defining distorted T-shaped openings, and gripper means for gripping the outer T-shaped portion of the H-beam, and means for supporting and positioning the protective member on the beam.

2. The protective device as set forth in claim 1 wherein the protective member is cylindrical and rounded having a rounded front face and side faces, the inner wall being positioned behind the front face.

3. The device as defined in claim 1 including a flange portion formed integral with and along the length of said T-shaped portion in a manner so as to form an H-beam comprising said beam.

4. The device as defined in claim 2 wherein said cylindrical member includes a pair of opposed end closure walls including vent means therein to permit water to enter and exit from said chamber.

5. The device as defined in claim 3 or 4 wherein said beam is of such a length relative to one of said cylindrical members so as to accommodate at least two said cylindrical members in an end-to-end relation along its length.

6. The device as defined in claim 5 wherein said support means comprises an outwardly extending finger from a bottom end of said beam.

7. The device as defined in claim 4 wherein said cylindrical member is formed as by molding of a suitable high-impact plastic material.

8. The device as defined in claim 3 wherein said H-beam is formed of a suitable metal such as aluminum.

9. The device as defined in claim 7 wherein said T-slot bisects the width of said inner wall and includes a pair of opposed vertical edges defining an entrance thereinto.

10. The device as defined in claim 3 wherein said mounting portion comprises at least two bracket members fixed to opposed end portions of said beam and attachment means connecting said bracket members to a piling.

11. The device as set forth in claim 2 wherein the cylinder member includes an opposed pair of side walls connecting the inner wall with the rounded outer wall, the side walls normally urged toward each other creating a seam opposite the front face, the normally urged together side walls defining gripper means and the opposed side walls also defining an interior chamber within the protective member.

12. The protective device as set forth in claim 1 or claim 9 wherein the protective member is bifurcated.

* * * * *